July 2, 1946. G. C. SULLIVAN 2,403,247
FASTENING DEVICE
Filed Dec. 19, 1942
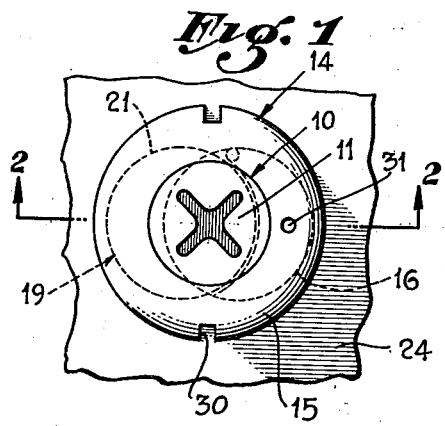
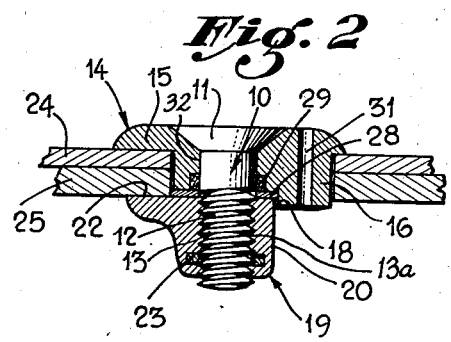
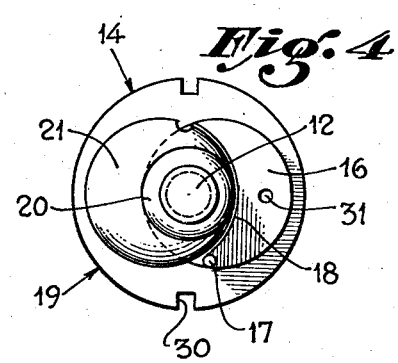
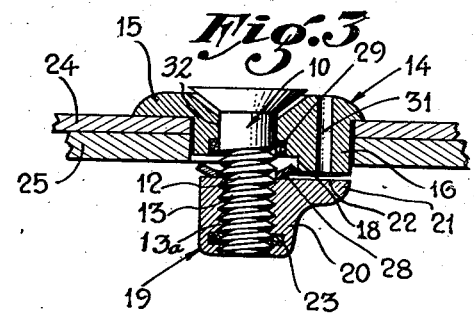
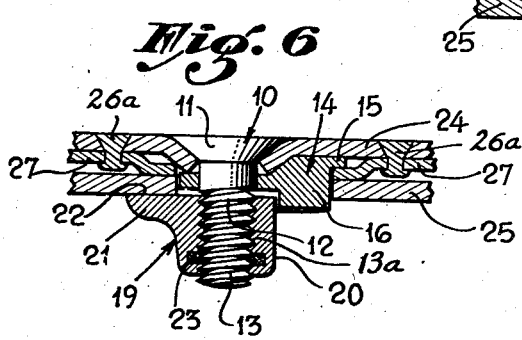
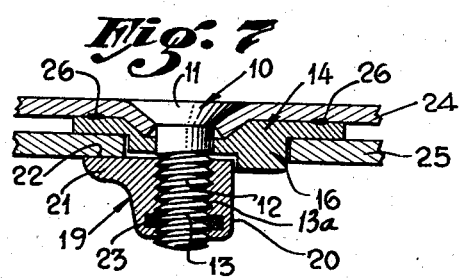
Inventor
George C. Sullivan Patented July 2, 1946

2,403,247

UNITED STATES PATENT OFFICE 2,403,247

FASTENING DEVICE

George C. Sullivan, Hollywood, Calif., assignor to Lockheed Aircraft Corporation, Burbank, Calif.

Application December 19, 1942, Serial No. 469,517

7 Claims. (Cl. 24—221)

This invention relates to improvements in fastening devices, and more particularly to fastening devices which may be installed and operated from one side of a structure; that is a coupling or fastener to make a connection between parts or members such as plates or sheets of material which are accessible from one side only. These installations are commonly known as "blind installations." This device is useful particularly where it is under high shear and bearing loads.

This invention finds its principal application in connection with industries which are concerned with the use of a large amount of sheet material, for the device offers an efficient means of fastening such material, whether it be of metal, wood, plastic or otherwise. The fastener has usage in the aircraft, automobile, household appliance, heavy machinery and equipment, the transportation industry, and other industries. It may be used as a locating pin, a clamp, a rivet, a removable coupling, a blind bolt, or the like joining or attaching means as is required by the particular installation.

There are, at present, devices which may be used in blind installations, however, to my knowledge, they all pertain to a unit which either is not demountable or removable after once being installed, or if demountable the nut portion of the unit remains with the structure. My invention discloses a unit which is constructed as a simple, one-piece-assembled fastener which can be completely installed and removed as a unit.

The prior art will disclose several designs of locating pins or bolts, in which the nut may be locked because of eccentric operating means as is disclosed in my invention. These devices are commonly held taut by means of resilient elements, such as springs, etc. In many usages of such a device, the inherent resilient feature is very undesirable as it does not necessarily hold the parts together under reasonable tension loads, thus this type of fastener is an undependable and inaccurate means of fastening. My invention discloses a novel means of producing a fastener of this type with the additional desirable ability and advantage of positive tightening and locking.

A further object of my invention is to disclose a fastener unit containing such desirable features as simplicity in design and production thus producing an economical unit, foolproof and self-locking qualities requiring only simple tools for operation, a liquid-tight unit for use in pressure vessels, etc.

Other objects and features of the invention will be evident hereinafter.

The invention will be described by reference to the accompanying drawing of a preferred embodiment thereof in which:

Figure 1 discloses the plan form of the fastener unit as it would appear when associated with a sheet of material, while Figure 2 is a sectional view of such a unit, according to 2—2 of Figure 1, showing the rotating element or nut in a locked position.

Figure 3 discloses a view of the unit taken along 2—2 of Figure 1 in which such unit is shown in the unlocked, that is, in the inserting position while Figure 4 shows such a unit viewed from the blind side thereof, the unit being in a fastened or locked position.

Figure 5 is a sectional view taken along 2—2 of Figure 1 with the exception that Figure 5 shows a flush type fastener device, a fastener in which the top surface of the sleeve or bolt is approximately level with the surface of the fastened material.

Figures 6 and 7 are sectional views of flush units taken in accordance with Figure 5, which views illustrate two of the many ways in which the unit may be attached to one part of the assembled structure, if so desired.

Referring to the figures, it will be seen that the preferred embodiment of my invention comprises three principal parts, a threaded element or bolt, a sleeve and a rotating element or nut. The bolt can be any of the types commonly sold on the market, or can be one particularly designed for this unit.

Generally speaking, the fastener is constructed in such a manner that the sleeve and nut will fit into a hole or opening in the structural elements to be fastened together. After the unit has been positioned in the hole, a screw driver, coin, wrench or other suitable tool may be used to rotate the bolt and the nut to such a position, preferably about 180 degrees, that upon further effort the nut will be driven taut thus clamping the structural elements together. By reversing the motion, the unit can be removed or unlocked.

It is preferable that the separate parts be produced with minor tolerances so that a good fit exists between the various elements, thus making it a greater load-carrying device. Although I have found that the normal friction on the threads between the bolt and nut is sufficient to rotate the nut, I prefer to provide a friction-increasing means between the bolt and the nut to insure rotation of the nut. I also prefer to provide a means to control and limit the amount of rotation of the nut with respect to the sleeve, thus insuring positive locking of the nut against the structural elements. A second friction-increasing means may be provided between the bolt and the sleeve to prevent unnecessary and undesirable movement therebetween which may result from jarring, vibration, etc. An indicator may be provided which will disclose to the operator that the nut, which may be in a "blind installation" has actually turned into the locking position.

Referring to the detail parts as shown by the various figures, 10 indicates a bolt having a head 11 and a shank 12 with screw threads 13 thereon. The sleeve element 14 comprises principally a head 15 to prevent complete passage through the structural elements, a shank 16, a rotation control means 17 and a concave portion 18 to lock the unit. The rotative element or nut 19 comprises, in general, a threadedly apertured shank 20, a base 21 with a clamping face 22, and a friction-increasing means 23. The aperture in the shank 20 is eccentrically located with respect to the base 21, it being preferred that the eccentricity of these elements be approximately that eccentricity designed between the sleeve element and its aperture.

Figures 1, 2 and 4 disclose the essential features of the fastening device. It will be noted that the shank 16 of the sleeve 14 may be eccentrically located with respect to the head 15. Furthermore, the bolt 10 is eccentrically located in relation to the shank 16. This off-center feature permits the unit to be operated as a blind fastener. It is readily seen that as the unit is installed within an opening and a tool applied to the bolt, that as a twisting movement is applied thereto the nut 19 will revolve from the position in Figure 3 to the position shown in Figures 2 and 4. Upon further movement, the nut 19 will be driven into a clamping position because of the screw threads 13 on bolt 10 working in conjunction with the mated threads 13a in the nut 19. Because of the overlap produced by the concave portion 18, it is seen that the nut 19 may be drawn taut and is locked within the sleeve 14, thus preventing any possibility of the unit working loose. This is a very desirable feature.

Figures 2, 5, 6 and 7 disclose the unit in conjunction with a plurality of structural elements 24 and 25 which are to be fastened together. In the event the unit is desired to be fastened to the outside structural element 24, such may be accomplished by riveting as is shown by 26a of Figure 6 or spotwelding the head 15 of the sleeve 14 to such element, as is disclosed by Figure 7, the spot welds being shown at 28. Figure 6 shows the head 15 inserted between the element 24 and a third member 27 which in turn may be attached by conventional means such as rivets 26a to the element 24.

Figures 2 and 5 differ principally in that the latter is a flush-type unit. In these figures, it can be seen that the sheets 24 and 25 are clamped together between the face 22 of the nut, and the head 15 of the sleeve, this being made possible due to the concave portion 18 which permits the nut 19, to be drawn taut. As will be evident from the drawing, as soon as the nut is rotated into the locking position, it will be free of the sleeve element, and thus can be tightened until the structural elements 24 and 25 are rigidly fastened together, this being permitted by the concave portion 18 which is shaped to allow the nut to drop over or clear the shank 16 of the sleeve element, in which position the unit may be drawn taut. In order to control rotation of the nut 19, I prefer to have some restricting means such as the stop 17 which in this instance limits the movement in both directions. The stop 17 is preferably constructed as a pin installed in an aperture in or a projection protruding from the face of the shank 16. It is also preferred that the bolt 10 fit closely the aperture or hole 32 in the sleeve 14 in order that the nut 19 and bolt 10 will not freely rotate between inserting and locking position. A spring or resilient element 28 may be installed, if desired, around the screw 10 between the sleeve 14 and the nut 19 to resist the bending load on the screw 10 when in clamped position and/or to resist movement between these two parts. An alternative friction increasing means 29 which may be similar to the means 23 on the nut can be installed if desired to solve this action which may be undesirable in certain usages. The means 23 and 29 may be in the form of a fiber, rubber, leather or soft metal insert or other equivalent friction-increasing device.

Various improvements can be added to the unit if so desired. It has been found advantageous to have some means of preventing the tendency of the sleeve 14 to rotate within the opening as the unit is operated. I provide slots 30 in the head 15 in which a holding tool may be engaged, thus preventing rotation during operation of the unit.

In some particular blind usages of my fastening device, I have found it advisable to provide some means of determining whether or not the unit is locked. This may be accomplished in many ways, a simple one being to provide a small hole 31 in the shank 16 of the sleeve 14 through which the operator can visually see that the nut 19 is in a locked or unlocked position. He may use a sharp-pointed tool which can be inserted in the hole, and if the tool does not strike the face 22 of the nut 19 it may be assumed that the unit is fastened.

The foregoing description is not to be limiting, but is merely illustrative of a preferred construction, and I wish to be accorded the full scope of my invention as is represented by the following claims.

I claim:

1. A fastening device comprising in combination, a threaded element, a rotating element adapted to be passed through an opening in a plate, and a sleeve adapted to be positioned within the opening, said sleeve having a shank and a bore to permit passage of said threaded element therethrough, said bore being eccentrically located relative to said shank, said rotating element having a threaded eccentric connection with said threaded element and being so arranged and constructed that upon advancing rotation of said threaded element, the rotating element will revolve substantially one hundred eighty degrees to a position to lock the assembly.

2. A fastening device comprising in combination, a threaded element, a rotating element adapted to be passed through an opening in a plate, and a sleeve including a shank adapted to be positioned within the opening, said shank having an eccentrically located bore to permit passage of said threaded element therethrough, said sleeve including means to prevent movement of said fastening device during operation thereof, said rotating element having a threaded eccentric connection with said threaded element and being so arranged and constructed that upon advancing rotation of said threaded element, the rotating element will revolve substantially one hundred eighty degrees to a position to lock the assembly.

3. A fastening device comprising in combination, a threaded element, a rotating element adapted to be passed through an opening in a plate, and a sleeve adapted to be positioned within the opening, said sleeve including a shank and having a bore to permit passage of said threaded element therethrough, said bore being eccentrically located relative to said shank, said sleeve and rotating element including limiting means to control movement of said rotating element relative to said sleeve, said rotating element having a threaded eccentric connection with said threaded element and being so arranged and constructed that upon advancing rotation of said threaded element, the rotating element will revolve substantially one hundred eighty degrees to a position to lock the assembly.

4. A fastening device comprising in combination, a threaded element, a rotating element adapted to be passed through an opening in a plate, and a sleeve adapted to be positioned within the opening, said sleeve including a shank and having a bore to permit passage of said threaded element therethrough, said bore being eccentrically located relative to said shank, said sleeve and rotating element including a limiting means to control movement of said rotating element relative to said sleeve, said sleeve including means to prevent movement of said fastening device during operation thereof, said rotating element having a threaded eccentric connection with said threaded element and being so arranged and constructed that upon advancing rotation of said threaded element, the rotating element will revolve substantially one hundred eighty degrees to a position to lock the assembly.

5. A fastening device comprising in combination, a threaded element, a threadedly apertured rotating element to be passed through an opening in at least one sheet of material, and a sleeve element including a shank to be positioned within the opening, said shank having an eccentrically located bore to permit passage of the threaded element, said sleeve element including a limiting means to control movement of said rotating element relative to said sleeve and a concave portion adjacent the base therein to permit said rotating element to advance and fasten the assembly, said rotating element being eccentrically connected with said threaded element and including means connecting the threaded element and the rotating element to revolve in unison within the range determined by said limiting means whereby the rotating element may be turned to a locking or unlocking position by driving or retracting said threaded element.

6. In a fastening device to be secured in an opening in at least one sheet of material, the combination of a threaded element, a threadedly apertured rotating element capable of passing through said opening, and a sleeve element having a head to prevent complete passage through the opening and a shank substantially conforming to the contour of the opening, said sleeve element to be positioned within the opening and including a bore to permit passage of said threaded element therethrough, the axis of said bore being parallel with and eccentric to the longitudinal axis of said shank, said rotating element having an eccentric threaded connection with said threaded element and being so arranged and constructed that upon advancing rotation of said threaded element, the rotating element will revolve to a position to fasten and lock the assembly by the co-engaging action between said rotating element and said sleeve element.

7. In a fastening device to be secured in an opening in at least one sheet of material, the combination of a threaded element, a threadedly apertured rotating element capable of passing through said opening, and a sleeve element having a head to prevent complete passage through the opening, and a shank substantially conforming to the contour of the opening, said sleeve element to be positioned within the opening and including a bore to permit passage of said threaded element therethrough and a concave portion to permit said rotating element to advance and fasten the assembly, the axis of said bore being parallel with and eccentric to the longitudinal axis of said shank, said rotating element having an eccentric connection with said threaded element and being so arranged and constructed that upon advancing rotation of said threaded element, the rotating element will revolve to a position to fasten and lock the assembly by the co-engaging action between said rotating element and said sleeve element.

GEORGE C. SULLIVAN.